United States Patent [19]

Nelson et al.

[11] 4,005,305

[45] Jan. 25, 1977

[54] SHIELDING APPARATUS

[75] Inventors: Jerome W. Nelson; Ford S. Miller; James B. Randolph, all of Houston, Tex.

[73] Assignee: CRC-Crose International, Inc., Houston, Tex.

[22] Filed: June 11, 1974

[21] Appl. No.: 478,288

[52] U.S. Cl. .............................. 219/72; 219/60 A; 219/74; 219/122

[51] Int. Cl.² .......................................... B23K 9/16

[58] Field of Search ............... 219/60 A, 60 R, 72, 219/74, 122

[56] References Cited

UNITED STATES PATENTS

| 1,552,369 | 9/1925 | White | 219/122 X |
| 1,711,151 | 4/1929 | Lincoln | 219/74 |
| 1,749,765 | 3/1930 | Hendrickson | 219/74 |
| 2,981,824 | 4/1961 | Kitrell | 219/74 X |
| 3,136,882 | 6/1964 | Radtke | 219/74 X |
| 3,604,612 | 9/1971 | Miller et al. | 219/60 A X |

*Primary Examiner*—J. V. Truhe
*Assistant Examiner*—N. D. Herkamp

[57] ABSTRACT

A self-propelled arc welding device, which uses an inert gas within a primary zone to protect superheated metal from contact with atmospheric elements, is shielded with an outer compartment to protect against external air currents in the form of a portable shroud which closes off air currents along the work surface, at least partially. Particularly, for protecting girth welds in pipelines welded by a track-guided machine moving orbitally about the pipe, the compartment includes elements which make a substantially line contact with the pipe surface. The carriage which supports the welding device preferably carries the arc-enclosing shield. An observation window or opening for watching the arc is provided and free access to controls and adjustment means is permitted so that normal control operations are not hampered.

5 Claims, 5 Drawing Figures

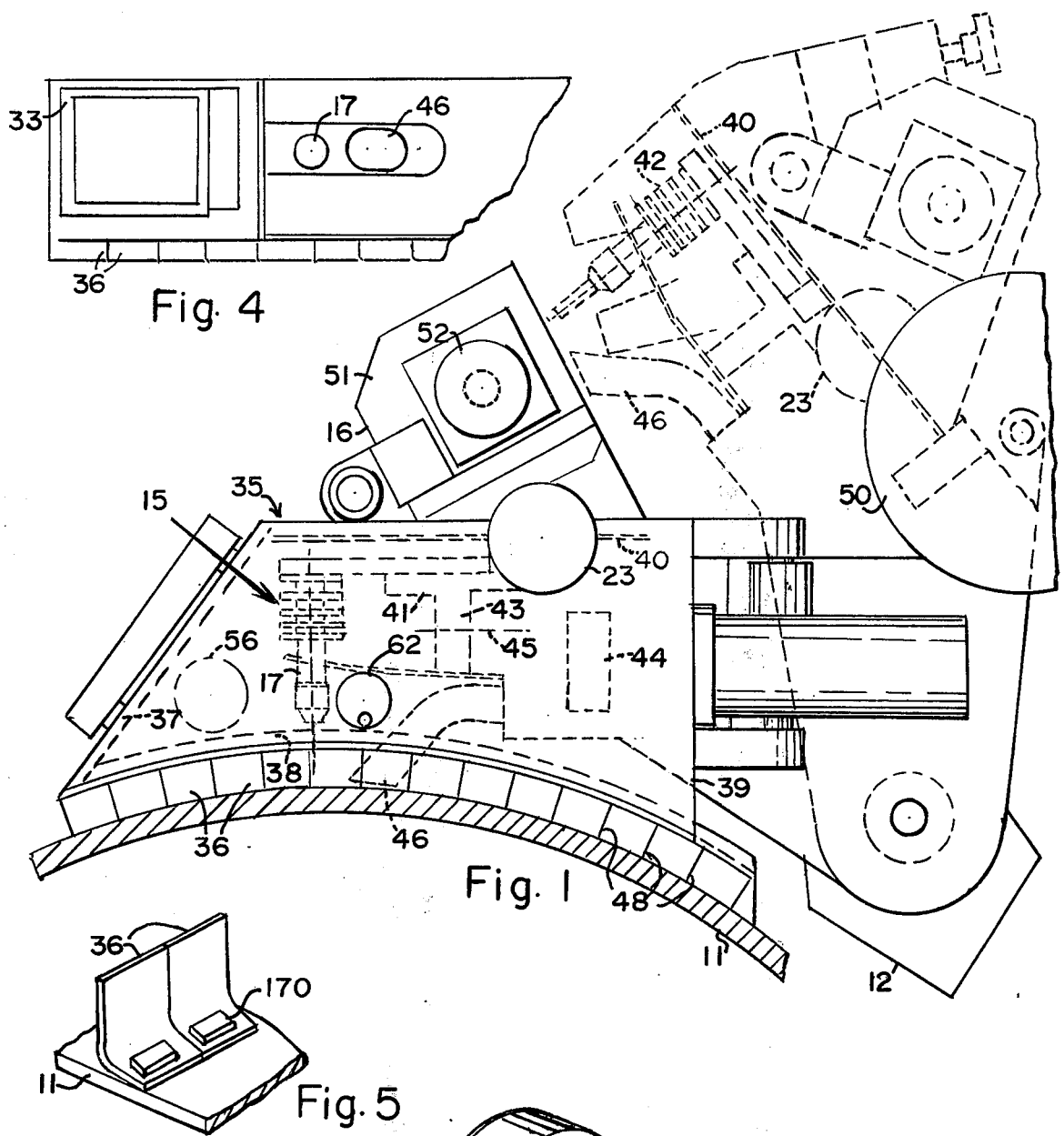
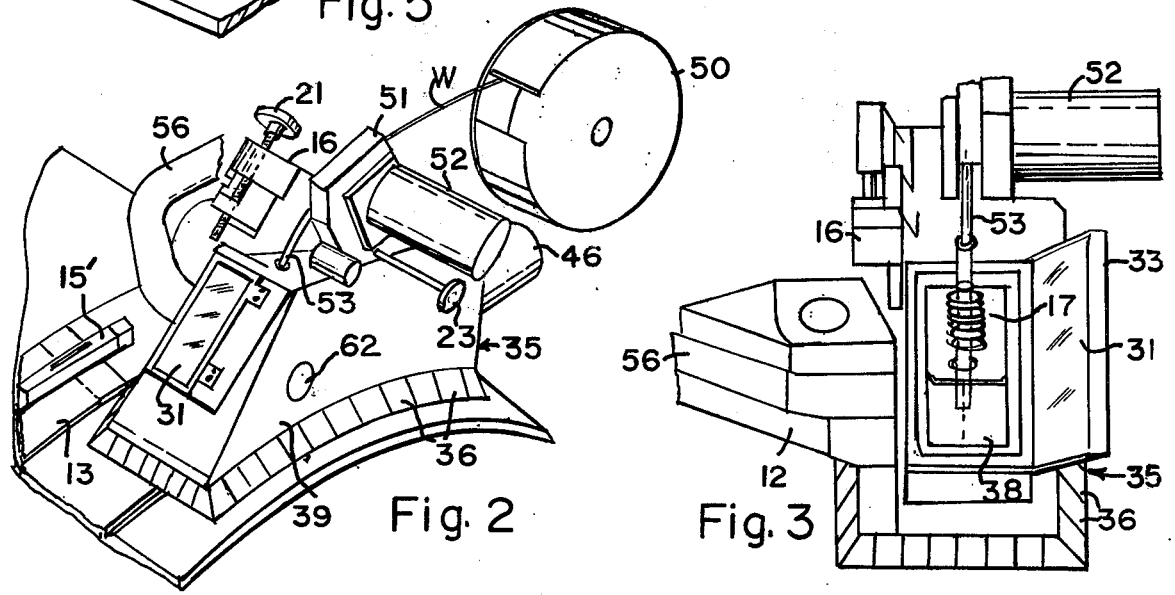

SHIELDING APPARATUS

BACKGROUND AND PRIOR ART

Many electric arc welding devices are known and used out of doors for numerous types of operations, including light and heavy construction of buildings, vessels, manufacturing equipment, bridges, trusses, pipelines, and the like. In order to produce welds of fine quality, it is common practice to blanket the arc and the metal being welded in the immediate vicinity of the arc with an inert gas such as argon, helium, carbon dioxide and other such unreactive gases and mixtures thereof. A primary enclosure or semi-enclosure tends to direct and hold this gas around or near the arc. The purpose of such blanketing, of course, is to prevent access of atmospheric air to the arc and to the highly heated metal in its vicinity. Steels and other ferrous metals, in particular, along with other metals, including aluminum, are very susceptible to oxidation by atmospheric oxygen. Defects in welds are often produced if free access to the air is permitted. Various means are provided for maintaining a supply of the inert gas around the arc and these generally are quite satisfactory when there is no wind or other significant motion of the atmosphere around and within the equipment. For further protection of the arc and the gas blanket against winds and other strong air currents, tents of various kinds have been used but these are often unsatisfactory. Barriers of other types have often been designed or proposed. In most cases these are unwieldy and cumbersome; requiring extra manpower and consequently reducing useful production. Strong winds along or across pipelines tend to flow in a thin layer, a sort of skin effect, along or over the pipe surface and barriers which do not fit closely are often quite inadequate. The pipe is often at varying levels from the ground making it difficult to seal a tent around it. The pipe surface usually is not truly round or smooth enough that a conventional rigid barrier will give adequate protection against these surface-following air currents.

In particular, when the welding apparatus is small and of gas-shielded type, and especially if it is of orbiting or other self-propelled character, requiring close operator control for proper operation, the use of heavy tents or massive barriers as wind-breaks, and of other large protective devices is burdensome and inefficient. This sophisticated equipment is not compatible with heavy tentage and the like. It therefore has become necessary to devise secondary shrouding or shielding means of much lighter weight which (a) preferably can travel with the welding apparatus while not interfering with its operation, (b) will give good protection in detail, particularly against surface air currents, while still permitting free access by the operators to the controls and for observation of the welding operation as it proceeds, and (c) is readily adaptable to the welding apparatus without undue complexity while avoiding overloading it or its drive means. To make such equipment available is a primary object of the present invention.

While specific shielding equipment or apparatus will be described herein, with particular application to specific, known types of orbitally movable welding equipment designed especially for welding the girth joints in large diameter pipelines will be explained, it will be understood that neither the particular apparatus, shown and explained in detail, nor its special application to the very specific equipment shown, is to limit the design or utility of the invention any farther than is necessary to distinguish the invention from the prior art. The equipment has a number of variations and modifications by which it may readily be adapted by those skilled in the art, to other and wider uses.

BRIEF DESCRIPTION OF DRAWINGS

FIG. 1 is a side view, showing a preferred form of the invention as applied to a traveling track-guided pipeline joint welding machine, the latter not being part of the invention but being shown mainly for background.

FIG. 2 is a perspective view of FIG. 1 on a smaller scale, showing the shielding device from another angle, and FIG. 3 is a fragmentary view from the left, or front, of FIGS. 1 and 2, showing certain parts in changed positions.

FIG. 4 is a detail top view of the shielding or shrouding structures of FIG. 1, certain parts being omitted.

FIG. 5 is a detail view of a modification showing means for holding marginal shield elements in position.

DESCRIPTION OF PREFERRED EMBODIMENT

Referring first to FIGS. 1, 2, 3, and 4, the apparatus there disclosed includes welding equipment which is mounted on a pipeline 11. This line is surrounded by a guide band or track 13 the ends of which are clamped together by appropriate tightening mechanism 15 generally similar to the structure and arragement shown and described in detail in U.S. Pat. No. 3,604,612. As further described in said Patent, a traveling carriage 12 which is self-propelled is mounted on the band or track 13 and is adapted to travel at a predetermined speed around the pipe carrying a welding machine which is mounted on said carriage 12 through a side plate 16. The welding machine is indicated generally at 15 and includes a welding head 17, shown in dotted lines in FIG. 1 and shown more clearly in FIG. 3. Power supply means of appropriate type are connected to the welding machine to supply energy at the electric arc where the welding takes place. These are of conventional type and need not be described herein. The welding head 17 is capable of adjustment towards and away from the work by an adjusting screw 21 which regulates the contact tube-to-work distance (CTWD). The head also is adjustable laterally for alignment with the line or plane of the weld by an adjustment screw 23. In view of the fact that this is a high precision type welding equipment, and the groove or kerf to be filled with molten metal usually is very narrow, this machine necessarily must be carefully controlled and the adjusting means are correspondingly designed for accurate adjustment. It is therefore essential that adjusting screws 21 and 23 be always available to the operator for making slight or major corrections, if necessary, in the positioning of the welding arc with respect to the work. Hence any shrouding or shielding device which is used must permit free access to these adjusting mechanisms.

It is also highly desirable for the operator to be able to observe the work as it proceeds. For this purpose a window 31 is mounted in a hinged door 33 which in turn is secured to a framework on which the shielding apparatus or shrouding device is mounted. The latter is indicated generally by the arrow 35 and consists of an enclosure supported by a light framework, 37 including a lower shielding plate 38. The light framework is covered by a flexible or semi-flexible sheet material 39 which desirably is of good heat resistant material. Inasmuch as this material surrounds and is fairly close to the electric arc it must be able to withstand a temperature in excess of 300° F., and preferably a temperature of 350° - 400° F. or higher. The enclosure also includes a cover plate 40 which can be raised with the welding head when said head is moved clockwise to a raised, inoperative position for inspection etc., as shown in dotted lines, FIG. 1. This gives access to the inside of the shield enclosure. Cover plate 40 appears in dotted lines in both positions of FIG. 1.

Referring to FIG. 3 for further details the door 33 is shown open to make visible the welding mechanism and its surroundings. Door 33 is hinged with spring control means to stand open or closed, as desired, without other fastening elements. The welding head assembly 42 is mounted on a supporting bar 41 mounted in turn on an appropriate support 43 which is capable of being oscillated by mechanism 44 more fully shown and described in U.S. Pat. No. 3,806,694. The reason for oscillating the welding device, specifically head 17, is to provide suitable width of deposited weld material as for capping the joint. For filling the joint below the cap there may be some oscillation required but this gap is usually narrower than the cap and the amplitude of oscillation is correspondingly less. In either case it may be desirable to oscillate the welding head 17 about the axis of oscillation 45 laterally to at least a short distance in order to fill the gap properly and to cover it when it is completed.

A consumable wire electrode is supplied from a reel 50 supported by the traveling welding apparatus being driven to the welding arc by a feed mechanism 51, the wire being guided through a guide conduit 53 consisting of a spirally wound metal coil 53. The latter prevents kinking of the wire as it advances from the drive means through the head 17 to the arc. The arrangement per se is now well known in the art being described in U.S. Pat. Nos. 3,632,959 and 3,806,694.

In order to protect the arc and the molten metal around it from oxidation by atmospheric oxygen, reaction with nitrogen, etc., it is usual practice to supply a blanket of inert gas such as helium, carbon dioxide, argon or a mixture of inert gases of this general type. An important object of the present invention is to make sure that this protective blanket of inert gas surrounds the arc at all times and is not blown away or disrupted by winds or other strong air currents from outside the welding system. This blanket of inert gas may be supplied by a tube 46 which is often concentric with the nozzle but as shown here is a separate nozzle. Nozzle 46 directs the inert gas in such a way as to give some support to the molten metal, particularly when the welder is passing through a more or less vertical path and the molten metal is particularly susceptible to the force of gravity, as it tends to run along or out of the joint. By directing the stream of inert gas in an appropriate direction and with appropriate velocity the flow of metal may be controlled to a considerable extent, as more fully explained in the above mentioned U.S. Pat. No. 3,806,694. The shroud of shielding structure of the present invention, which surrounds the arc and its vicinity, is not necessarily made air tight but it is so designed that it will substantially exclude gusts of wind or other undesirable air currents from external sources.

As noted above, the wind sweeps along the pipe surface, and it is particularly desirable to stop it or deflect it in such a way as to prevent it from disrupting the inert gas blanket around the arc. By using for the enclosure 39 a sheet material which has some flexibility, that part of the shroud which is near the work surface may be modified so as to permit smooth travel of the shield, along with the welder, and without excessive drag on the work. This is to be done in a way which substantially excludes the undesirable air currents. For this purpose, as shown in FIGS. 1 and 2 the lower margin of the sheet material may be slitted as at 48 to provide a sort of fringe 36 which is freely flexible to yield when passing obstacles on the pipe, such as side seams and the like, while normally it remains in position closely adjacent to the pipe. In this way, no substantial stream of air from the outside can enter the enclosure.

FIG. 4 shows a top view of the enclosure 39 itself. Other parts are exposed when the top closure 40 is in raised or non-working position as shown in phantom lines, FIG. 1. Since the apparatus may be used on work of different diameter and different curvatures, the flexible side fringe 36 may yield to accommodate a working surface of small radius (as indicated in FIG. 2) or one of greater radius, as shown in FIG. 1. The use of such a fringe, then, is desirable for situations of this kind.

For reasons discussed further below, it is desirable in many cases to apply a vacuum force to the enclosed chamber. This vacuum force is found to remove fumes and at least some of the spatter from the arc. A vacuum tube 56, connected to a vacuum pump or source, not shown, and connected above the lower partition or shielding plate 38, does not materially affect the inert gas blanket which is below this plate. It helps also to keep observation window 31 clean.

An access opening 62, closed with a small flap door, FIG. 1, is provided for use of a tool as for limited cleaning purposes in the arc area.

As already suggested, a pipe or other work body 11 may vary in curvature or radius or it may have surface irregularities so that gaps may be formed between the bottom edge or fringe 36 of the enclosure of FIG. 1.

FIG. 5 shows a detail wherein the fringe elements 36, as in FIG. 1, are held down against the pipe surface 11 by small magnets 170 attached to individual fringe elements. Instead of separate magnet elements, the fringe elements 36 themselves may be made of or laminated to a magnetic plastic or rubber material. Such materials are available and well known in the art.

In general, the apparatus described above, and the methods and procedures involved in the present invention, may be summarized as follows:

a. Wind currents which disrupt welding operations, especially when weather conditions are at their worst, can be controlled by simple and effective means, designed to encompass and/or to travel with sophisticated welding equipment. The protective shields or enclosures are light in weight and easily secured to or released from the work and from well known and commercially successful types of welding equipment.

b. The means and procedures of this invention provide improved operator protection as well as protection to vital and sensitive equipment against heat, cold, radiation, fumes, spatter, and other objectionable conditions and materials.

c. The quality of the welding is improved and stabilized, requiring less inspection effort and minimizing repair costs.

d. Depending on specific needs, the equipment can readily be tailored to the welding equipment.

Other properties and other advantages will readily be apparent. While a number of options and variations have been described, it will be apparent to those skilled in the art that there are many others that are equivalent and can be substituted usefully and effectively. Variations in design, in details of construction, and in materials, will suggest themselves and modifications and adaptations that are within the concept, spirit, and purpose of the invention will be self-evident. It is intended by the claims which follow, to cover all these as broadly as the state of the prior art properly permits.

What is claimed is:

1. In apparatus for arc welding around a curved surface, such as the surface of a pipeline, which is subjected to external air currents that tend to interfere with the welding, and in which an arc-producing torch means is supported on a traveling carriage guided over said curved surface, and wherein the torch means is arranged to be moved selectively on the carriage from a working position adjacent the surface to a non-working position remote from said surface, the improvement which comprises a housing structure supported on said carriage separately from said torch means but normally surrounding the torch means in its working position and arranged to protect said torch means in said working position and during carriage travel from said air currents by maintaining substantially air current-excluding contact with said surface regardless of the position of the torch means in either working or non-working positions, said housing having an access opening on its side remote from the said surface, and a closure plate for said opening associated with the welding torch means and arranged to close the access opening when the torch means is in working position and to open said access opening when the torch means is in non-working position.

2. Apparatus according to claim 1 which includes a flexible skirt portion on the enclosure for contacting the curved surface and thereby more fully sealing the enclosure with respect to said surfaces of said work pieces to effectively block streams of wind which tend to flow along said surfaces.

3. Apparatus according to claim 1 in which the enclosure comprises in part a flowing stream of inert gas to assist in sealing the arc against said external air currents.

4. Apparatus according to claim 1 in which the housing includes a fringe resting on said curved surface to block wind streams flowing along said surface.

5. Apparatus according to claim 4 in which magnetic means are included to hold the fringe against said surface.

* * * * *